Jan. 31, 1967 S. J. PLATT 3,301,564

PLAY-BACK INSTRUMENT FOR MAGNETIC TAPE CARTRIDGE

Filed June 4, 1964 2 Sheets-Sheet 1

INVENTOR.
STANTON J. PLATT
BY C. G. Stratton
ATTORNEY

Jan. 31, 1967 S. J. PLATT 3,301,564

PLAY-BACK INSTRUMENT FOR MAGNETIC TAPE CARTRIDGE

Filed June 4, 1964 2 Sheets-Sheet 2

INVENTOR.
STANTON J. PLATT
BY C. G. Stratton
ATTORNEY

United States Patent Office
3,301,564
Patented Jan. 31, 1967

3,301,564
PLAY-BACK INSTRUMENT FOR MAGNETIC TAPE CARTRIDGE
Stanton J. Platt, Beverly Hills, Calif., assignor to Fred P. Silva, Encino, Calif.
Filed June 4, 1964, Ser. No. 372,472
1 Claim. (Cl. 274—11)

This invention relates to a recorder play-back instrument for a magnetic tape cartridge.

Prior endless magnetic tape cartridges are usually provided with a roller over which the tape is trained and which cooperates with a driven capstan to drive the tape. Another known cartridge omits the roller, the same being provided in the recorder play-back instrument and movable from a retracted position within the interior of said instrument to a projected position pinching the tape against a drive capstan.

The present invention has for an object to provide a recorder play-back instrument that mounts a tape-pinching roller that is moved by a cartridge, the tape of which is to be pinched between the roller and a drive capstan and released therefrom, thereby providing a mechanism in which the cartridge is the means for operatively projecting and retracting the tape-pinching roller.

Another object of the invention is to provide a novel combination of recorder play-back instrument and endless tape magazine in which all that is necessary to engage or disengage the drive means for the endless tape is to manually move the cartridge.

A further object of the invention is to provide a novel combination as above characterized in which over-center snap action automatically effects operative engagement and release of the drive means during such manual movement of the cartridge.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

Figure 1:
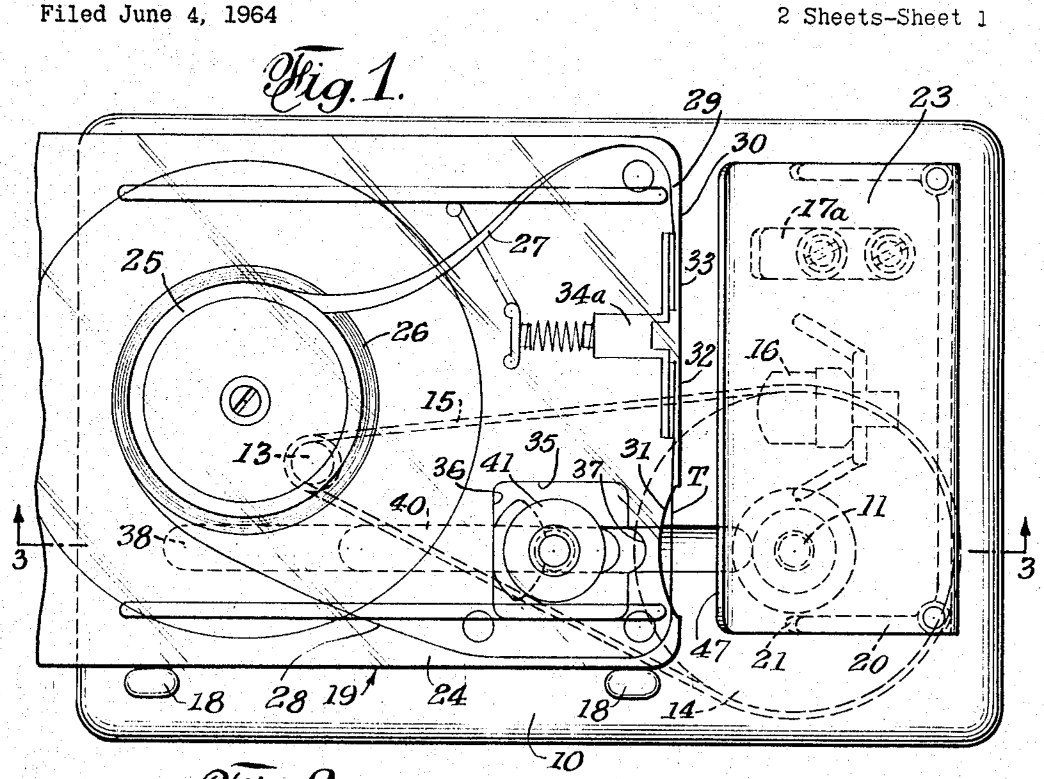
FIG. 1 is a top plan view of a recorder play-back instrument according to the present invention, a magnetic tape cartridge being shown in position preparatory to being moved to a drive-engaged position of said instrument and cartridge.
Figure 2:
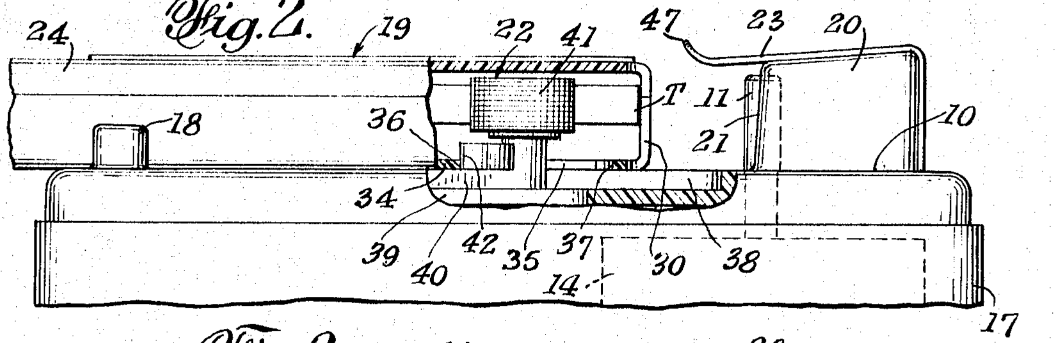
FIG. 2 is a broken and partly sectional view of the mechanism as shown in FIG. 1.

The recorder play-back instrument shown in the drawings generally conventionally comprises a top deck 10; a drive capstan 11 that extends from said deck and is driven by a motor 12 by means of a pulley 13 on the motor shaft, a driven fly-wheel pulley 14 on said capstan, and a belt 15 trained around said pulleys; a transducer head 16 alongside; and a mechanical cue switch **17*a* alongside the transducer head 16. It will be understood that the motor 12, the speaker that is excited by the transducer head 16, and all necessary electrical and mechanical parts and circuitry for reproducing the magnetic recordings on the tape as the same is in contact movement against the head 16, are contained in a housing 17 upon which the deck 10** is provided.

According to the invention, the deck 10 is provided with guide lugs 18 for a cartridge 19, means 20 having abutment edges 21 to limit the manual positioning of said cartridge relative to the capstan 11, transducer head 16, and cue switch 17.

The above-described recorder play-back instrument is provided with slide means 22 for pinching an endless magnetic tape T against the capstan 11 and releasing said tape, and with a retention plate 23 to frictionally hold the cartridge 19 in the drive position of its tape T.

The cartridge 19 that is illustrated conventionally comprises a flat, rectangular housing 24, a reel 25 within said housing on which is a coil 26 of the tape T that has a pay out end 27 from the inside of the coil, a take up end 28 to the outside of the coil, and a loop 29 that runs parallel to and inside of an end wall 30 of the cartridge housing 24. Said end wall 30 has an opening 31 that is in alignment or register with the capstan when the cartridge is in slide-guiding position against the guide lugs 18 on the deck, and openings 32 and 33 respectively aligned with the transducer head 16 and the cue switch 17. A light spring brake **34*a* frictionally engages the tape spanning the openings 32 and 33**.

According to the invention, the bottom wall 34 of the cartridge housing 24 is provided with an opening 35 of rather large size, the same having an abutment edge 36 at the end of said opening nearer to the reel 25, and an abutment edge 37 between the edge 36 and the housing wall 30.

The slide means 22 is shown as a slideway 38 in the deck 10 in alignment with the capstan 11, an elongated opening 39 in the bottom wall of said slideway, a slide bar 40 slidingly fitted in said slideway, a tape-pinching roller 41 carried on the end of the bar 40 directed toward the capstan 11, an abutment enlargement 42 on said bar adjacent the roller 41 for engagement with the edge 36 of the cartridge housing bottom wall 34, an extension 43 on the slide bar disposed in and slidable along the opening 39 of the bottom wall of the slideway 38, and a snap-over hairpin spring 44 with one end 45 engaged with a post on the underside of the deck 10 and the other end 46 engaged with a post on the underside of the extension 43 of the slide bar 40.

OPERATION

Figure 4:
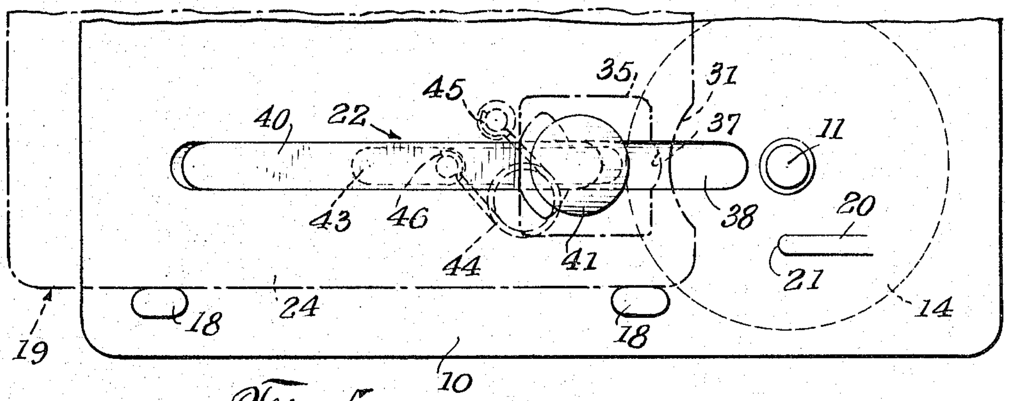
FIG. 4 is a broken plan view of the recorder instrument in the position of FIG. 1.

The normally retracted position of the slide means 22, as in FIGS. 1 and 4, has the spring 44 biasing the slide bar 40 in a direction to separate the pinch roller 41 from the capstan 11, the extension 43 engages the left end of the opening 39 to limit this position in which the roller 41 is so spaced from the edge 47 of the plate 23 that a cartridge 19 may be placed over the slide bar laterally against the lugs 18 with the roller 41 extending through the opening 35. Thus, the loop of the tape T is disposed between the roller 41 and the capstan 11.

Figure 5:
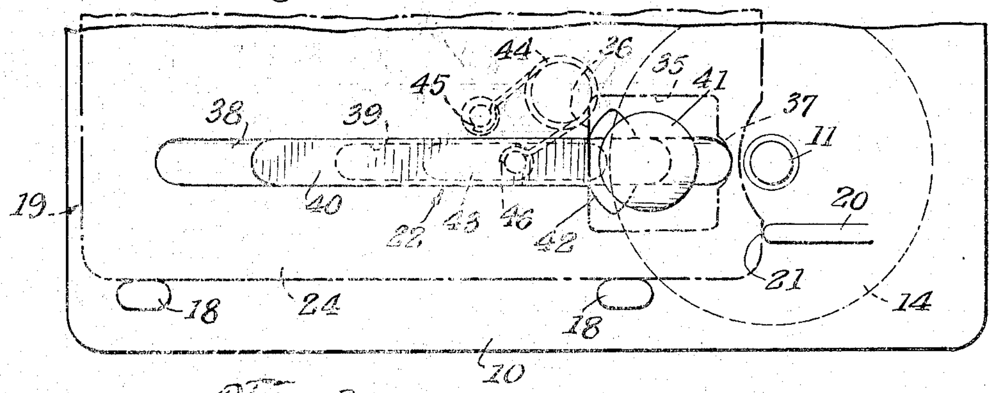
FIG. 5 is a similar view of said instrument after the cartridge has been moved to the limit of its operating position but before the automatic engagement of the tape-driving means.
Figure 6:
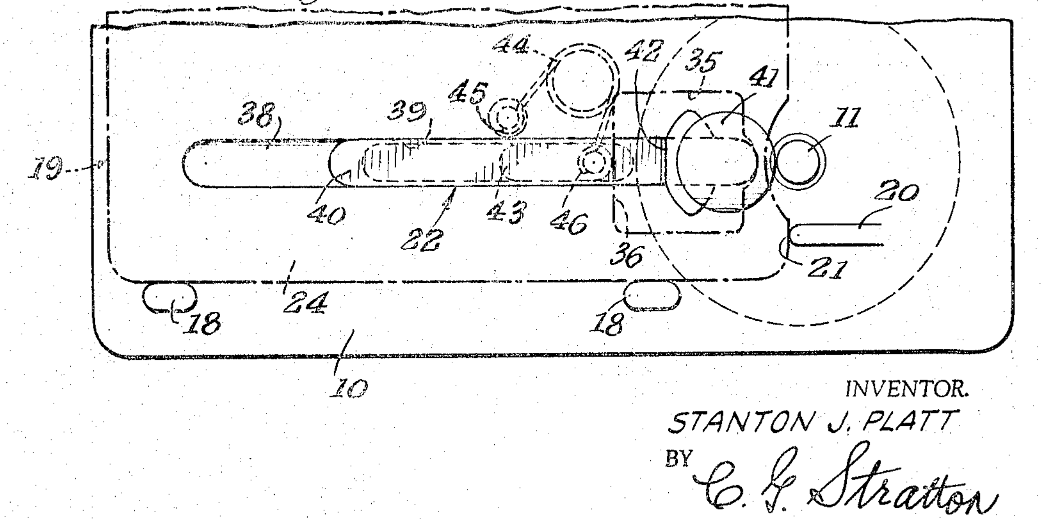
FIG. 6 is a similar view showing the parts in drive-engaged position.

Now, as the cartridge 19 is slid toward the right over the surface of the deck 10, the abutment edge 36 encounters the abutment enlargement 42 of the slide bar and the slide bar starts moving in a direction toward the capstan, the hairpin spring 44 beginning its movement to an over-center position which it achieves just before the wall 30 of the cartridge contacts the abutment edges 21 of the deck 10. Therefore, the spring 44, shown in FIG. 5 just after the same is snapped over center, snaps the slide means toward the right to cause the roller 41 to pinch the tape T against the capstan.

Since, when the cartridge reaches its limit position, as above, the tape is simultaneously brought into contact with the transducer head 16 and the cue switch 17*a*, the brake 34*a* retracting accordingly, the instrument will reproduce the record that is on the tape T in a continuous manner, the tape coil paying out and taking up as hereinbefore described.

Figure 3:
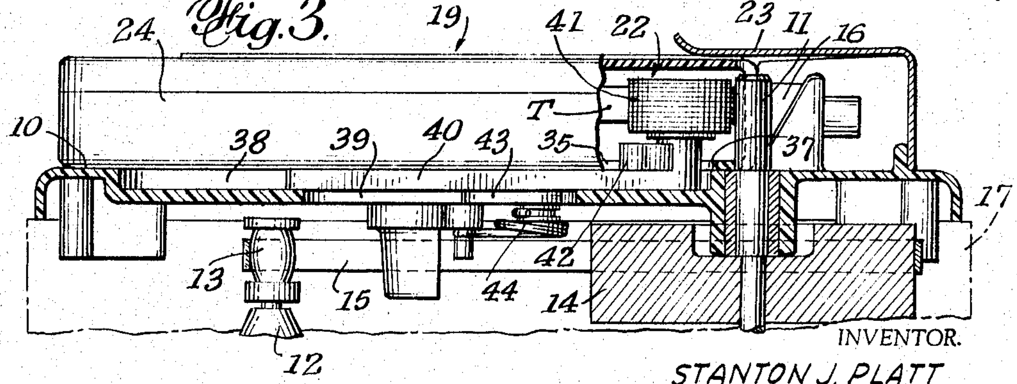
FIG. 3 is a longitudinal sectional view as taken substantially on the line 3—3 of FIG. 1, the cartridge being shown in tape-driving position.

To stop the recording operation, it is necessary only to manually retract the cartridge 19, the abutment edge 37 thereof engaging the right end of the slide bar 40 to return the snap over spring 44 to its initial condition wherein the same propels the slide means 22 back to fully retracted position, as in FIG. 3. The same or another cartridge may now operate the slide means 22, as above described.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claim.

Having thus described this invention, what is claimed and desired to be secured by Letters Patent is:

In a recorder playback instrument having a deck with a driven capstan extending through the surface of the deck:

(a) said deck having a groove in its surface with one end adjacent the capstan and extending longitudinally to an opposite end, (b) a slide fitted in and shorter than said groove with its upper face flush with the deck surface, (c) a tape-pinching roller on the end of the slide directed toward the capstan, (d) the deck, in register with the groove, having an elongated opening shorter than the groove with both ends thereof spaced from the respective ends of the groove, (e) an extension on the lower face of the slide disposed in and shorter than said elongated opening, and (f) an over-center spring beneath the deck having one end connected to said slide extension and having an opposite end connected to the under surface of the deck, (g) said spring, in one over-center position, biasing the slide to abut said extension against the end of the elongated opening that is remote from the capstan, thereby locating the tape-pinching roller thereon in spaced-relation to the capstan, and (h) said spring, in the other over-center position biasing the slide in a direction toward the end of the elongated opening that is adjacent to the capstan, thereby locating the tape-pinching roller thereon into driving engagement with the capstan to feed tape pinched between the capstan and said roller.

References Cited by the Examiner

UNITED STATES PATENTS 2,944,825 7/1960 MacSinger ------------ 274—4

JOHN M. HORAN, *Primary Examiner.*

CLIFFORD B. PRICE, *Examiner.*